(12) United States Patent
Rahman et al.

(10) Patent No.: US 7,919,755 B2
(45) Date of Patent: Apr. 5, 2011

(54) DENDRIMER BASED ELECTRO-OPTIC SENSOR

(76) Inventors: Anis Rahman, Hummelstown, PA (US); Aunik K. Rahman, Hummelstown, PA (US)

( * ) Notice: Subject to any disclaimer, the term of this patent is extended or adjusted under 35 U.S.C. 154(b) by 0 days.

(21) Appl. No.: 11/862,473

(22) Filed: Sep. 27, 2007

(65) Prior Publication Data

US 2008/0128618 A1 Jun. 5, 2008

Related U.S. Application Data

(63) Continuation-in-part of application No. 10/710,303, filed on Oct. 15, 2004, now Pat. No. 7,389,029, and a continuation-in-part of application No. 11/335,110, filed on Jan. 19, 2006, now Pat. No. 7,412,121.

(60) Provisional application No. 60/827,206, filed on Sep. 27, 2006, provisional application No. 60/593,508, filed on Jan. 20, 2005.

(51) Int. Cl.
  *G01N 21/35* (2006.01)
(52) U.S. Cl. .................................... 250/341.1
(58) Field of Classification Search ................. 250/341, 250/394, 393, 216, 227.11; 385/129
  See application file for complete search history.

(56) References Cited

U.S. PATENT DOCUMENTS

| | | | |
|---|---|---|---|
| 7,389,029 B2 * | 6/2008 | Rahman et al. | 385/129 |
| 7,391,032 B1 * | 6/2008 | Hyde et al. | 250/394 |
| 2004/0022475 A1 * | 2/2004 | Pennington | 385/12 |
| 2005/0002628 A1 * | 1/2005 | Rahman et al. | 385/129 |
| 2006/0104480 A1 * | 5/2006 | Fleisher | 382/103 |
| 2007/0235658 A1 * | 10/2007 | Zimdars et al. | 250/390.07 |
| 2008/0007817 A1 * | 1/2008 | Hochberg et al. | 359/333 |
| 2009/0022445 A1 * | 1/2009 | Hochberg et al. | 385/3 |

OTHER PUBLICATIONS

Wang et al., Metal wires for terahertz wave guiding, 2004, Nature Publishing Group, pp. 376-379.*
Ma et al., Functional Dendrimers fro Nonlinear Opticsl, 2001, Adv. Mater. 13, No. 15, pp. 1201-1205.*
JP 09-274117 machine translation, Takashi et al.*
09-274117 Abstract machine translation, Takashi et al.*
Tomalia, Donald A., Birth of a New Macromolecular Architecture: Dendrimers as Quantized Building Blocks for Nanoscale Synthetic Organic Chemistry, Aldrichimica Acta, vol. 37, No. 2, 2004.
J. Ahn et al., Terahertz waveform synthesis via optical rectification of shaped ultrafast laser pulses, Optics Express, vol. 11, No. 20, Oct. 6, 2003, pp. 2486-2496.
Rahman, Anis, Nanophotonic Integrated Circuit: A Platform for "Optical Processor", web page, Applied Research and Photonics, Inc., pp. 1-18.
Website: http://prola.aps.org/abstract/PRL/v28/i14/p897_1, Physical Review Online Archive, Optical Rectification by Impurities in Polar Crystals, Apr. 1972, Issue 14, pp. 1-2.
Blum et al., "High-electric-field poling of nonlinear optical polymers", Optical Society of America, vol. 15, No. 1, Jan. 1998, pp. 318-328.
Boyd, Robert W., "Nonlinear Optics", Second Edition, Copyrighted 2003.

(Continued)

*Primary Examiner* — David P Porta
*Assistant Examiner* — Djura Malevic
(74) *Attorney, Agent, or Firm* — Volpe and Koenig, P.C.

(57) ABSTRACT

A high efficiency electro-optic dendrimer based technology for nanophotonic integrated circuit devices is presented. In particular, an electro-optic waveguide dendrimer for electro-optic sensor applications is implemented. A terahertz system for detecting and imaging objects is implemented using electro-optic dendrimer based terahertz emitters and probing sensors.

20 Claims, 15 Drawing Sheets

OTHER PUBLICATIONS

Cao et al., "Broadband generation of terahertz radiation in a waveguide", Optics Letters, Optical Society of America, vol. 29, No. 15, Aug. 1, 2004, pp. 1751-1753.

Carr et al., "High-power terahertz radiation from relativistic electrons", Nature, vol. 420, Nov. 14, 2002, pp. 153-156.

Chang et al., "Power scalable compact THz system based on an ultrafast Yb-doped fiber amplifier", Optics Express vol. 14, No. 17, Aug. 21, 2006, pp. 7909-7913.

Chen et al., "Electo-optic transceivers for terahertz-wave applications", Optical Society of America, vol. 18, No. 6, pp. 823-831.

Rahman, Anis, "Electro-optic properties of dendrimer", Optical Society of America, 2007, 7 pages.

Gadret et al., "Nonlinear Optical Properties of Poled Polymers", SPIE, vol. 1560, Nonlinear Optical Properties of Organic Materials IV, 1991, pp. 226-237.

Gordon et al., "Tunable, high peak power terahertz radiation from optical rectification of a short modulated laser pulse", Optics Express, vol. 14, No. 15, Jul. 24, 2006, pp. 6813-6822.

Hayden et al., "New Materials for Optical Rectifiaction and Electrooptic Sampling of Ultrashort Pulses in the terahertz Regime", Journal of Polymer Science: Part B: Polymer Physics, vol. 41, 2003, pp. 2492-2500.

Herman et al., "Chielectric relaxation: chromophore dynamics in an azo-dye-doped polymer", Optical Society of America, vol. 15, No. 1, Jan. 1998, pp. 351-358.

Website, http://spiedl.aip.org., "Highly efficient and thermally stable organic/polymeric electro-optic materials by dendritic approach", 2 pages.

Michelotti et al., "Study of the orientational relaxation dynamics in a nonlinear optical copolymer by means of a pole and probe technique", American Institute of Physics, vol. 80, No. 3, Aug. 1, 1996, pp. 1773-1778.

Mortazavi et al., "Second-harmonic generation and absorption studies of polymer-dye films oriented by corona-onset poling at elevated temperatures", Optical Society of America, vol. 6, No. 4, Apr. 1989, pp. 733-741.

Otomo et al., "Remarkable optical properties of dendrimers for laser applications", Linear and Nonlinear Optics of Organic Materials, Proceedings of SPIE, vol. 4461, 2001, pp. 180-187.

Rahman et al., "Adsorption of Poly(amidoamine) Dendrimers on Gold", American Chemical Society, 2000, pp. 10154-10160.

Website, http://www.sciencedirect.com, Nuclear Instruments and Methods in Physics Research Section A: Acceleratiors, Spectometers, Detectors and Associated Equipment: The new UCSB free-electron lasers, vol. 318, Issues 1-3, Jul. 1, 1992, pp. 225-229 (2 pages).

Reid et al., "Quantitative comparison of terahertz emission from (100) InAs surfaces and a GaAs large-aperture photoconductive switch at high fluences", Applied Optics, vol. 44, No. 1, Jan. 1, 2005, pp. 149-153.

Ricci et al., "Poling of multilayer polymer films for modal dispersion phase matching of second-harmonic generation: effects of glass-transition temperature matching in different layers", Optical Society of America, vol. 17, No. 8, Aug. 2000, pp. 1349-1353.

Schildkraut, Jay S., "Limitations to the determination of the optical properties of a thin film by combined ellipsometric and surface plasmon resonance measurements", Applied Optics, vol. 27, No. 16, Aug. 15, 1988, pp. 3329-3333.

Sinyukov et al., "Generation and detection of terahertz radiation with multilayered electro-optic polymer films", Optical Society of America, vol. 27, No. 1, Jan. 1, 2002, pp. 55-57.

Sinyukov et al., "Resonance enhanced THz generation in electro-optic polymers near the absorption maximum", American Institute of Physics, Applied Physics Letters, vol. 85, No. 24, Dec. 13, 2004, pp. 5827-5829.

Stuart et al., "Present Status of the Compact EM THz Source", 3rd EMRS DTC Technical Conference—Edinburgh 2006, 6 pages.

Teng et al., "Simple reflection techniques for measuring the electro-optic coefficient of poled polymers", American Institute of Physics, Applied Physics Letters, 56 (18), Apr. 30, 1990, pp. 1734-1736.

Xu et al., "Optical rectification in an area with a diameter comparable to or smaller than the center wavelength of terahertz radiation", Optical Society of America, Optics Letters, vol. 27, No. 12, Jun. 15, 2002, pp. 1067-1069.

Website, http://scitation.aip.org, Generation of Far-Infrared Radiation by Picosecond Light Pulses in LiNbO3, Applied Physics Letters, vol. 19, Issue 9, Nov. 1, 1971, pp. 320-323 (2 pages).

* cited by examiner

DENDRIMER BASED ELECTRO-OPTIC SENSOR

CROSS REFERENCE TO RELATED APPLICATIONS

This application claims the benefit of U.S. Provisional Patent Application Ser. No. 60/827,206, filed Sep. 27, 2006 and entitled "Electro-Optic Dendrimer, Electro-Optic Sensor, THz Waveguide, and Production Thereof"; and is a continuation-in-part of 1) of U.S. patent application Ser. No. 10/710,303, filed Oct. 15, 2004, now U.S. Pat. No. 7,389,029, issued on Jun. 17, 2008, which was published as US 2005/0002628 on Jan. 6, 2005 and which claims priority to U.S. Provisional Patent Application No. 60/481,056, filed on Jul. 3, 2003; and 2) of U.S. patent application Ser. No. 11/335,110, filed on Jan. 19, 2006, now U.S. Pat. No. 7,412,121, issued on Aug. 12, 2008, which was published as US 2006/0158230 on Jul. 20, 2006 and which claims priority to U.S. Provisional Patent Application No. 60/593,508, filed on Jan. 20, 2005. This application is related to U.S. Ser. No. 11/862,474, entitled "Dendrimer Based Terahertz Generator", filed Sep. 27, 2007 and U.S. Pat. No. 7,110,627, issued Sep. 19, 2006, all of which are herein incorporated by reference.

FIELD OF INVENTION

The present invention relates to dendrimer based electro-optic sensor having application in non-intrusive measurement of mid- to low-level temporal-electromagnetic fields (E-fields). It also relates to an electro-optic sampling sensor for terahertz imaging applications.

BACKGROUND OF THE INVENTION

Currently, electric-field (D-dot) probes are commonly used to measure the high power microwave (HPM) wavefront outside a target. However, these probes are insensitive to electric fields having strengths less than about 1 volt per meter (V/m) even at relatively low frequencies of less than about 10 gigahertz (GHz), and they are too large to install inside targets. Since the electromagnetic wavefront changes as it propagates inside a target, new probes that can be installed inside a target must be developed. Additionally, new sensors must receive both horizontally and vertically polarized signals and be capable of processing large field strengths without arcing or distorting the HPM waveform. New probes that can sense the horizontal and vertical components of the electric field inside a target over the full frequency range (100 MHz-100 GHz) are, therefore, important.

The limitation of sensing comes from the limitations of materials used. High performance materials needed for high-frequency, high-sensitivity EO devices such as the E-field probes. While there are several candidate materials such as ferroelectric relaxors, [e.g., lead magnesium niobate (PMN), lead zirconium niobate (PZN) and mixtures of these ferroelectric relaxors], and electro-eramics such as lead lanthanum zirconium titanate (PLZT), however, the biggest problem with these materials is that they are not compatible for monolithic fabrication. Additionally, they require very high temperature processing, beyond the range of lithography process.

BRIEF SUMMARY OF INVENTION

The present invention discloses a high efficiency electro-optic dendrimer waveguide based technology for nanophotonic integrated circuit devices. In particular, the details of a high sensitivity electro-optic sensor are disclosed. The EO sensor is used as a high power microwave sensor for identifying electromagnetic energy radiating objects. The EO sensor is also used as a probing sensor for terahertz imaging. The EO sensor is used in conjunction with a high power terahertz waveguide source that produces a higher output power. In particular, dendrimers have high EO efficiency, can be simultaneously fabricated on a chip allowing a highly reliable, compact, and efficient packaging suitable for installing inside targets. Additionally, monolithic fabrication allows for integration of the waveguide based components with other on-chip functionalities, thereby opening a door for a number of important chip based components having applications in communication, computing, and sensing.

DETAILS DESCRIPTION OF PREFERRED EMBODIMENT

I. Overview

Figure 1:
FIG. 1 shows the structure of a THz waveguide element in accordance with the invention.

Higher Electro-optic (EO) coefficient is a key material parameter to make high sensitivity device such as an EO sensor and high power terahertz source. Current EO sensors can measure ~1 V/m, limited to ~GHz frequency range. Dendrimer based EO sensor can achieve 0.1 V/m or better sensitivity and higher frequency (~100 GHz and higher) measurement capabilities.

Integrated chip architecture—Above all, dendrimer EO devices can be fabricated on a chip with multiple functionalities, leading to an optical processor that enables high-speed, high bandwidth computing and sensing with a higher reliability.

The aforementioned capabilities are unique and enable many new applications while aiding in significant improvement of current applications. In particular: High power CW terahertz generator may achieve 3040 times higher power compared to other sources. Seeing through mist and obstacles or over the hill. This can be done either with a UAV, MAV or from land based observation station via a dendrimer EO sensor.

In order to achieve the aforementioned enhanced capabilities and devices, one needs to address the following main issues: materials, design, process, and device.

I.A. Materials Used

In general, for electro-optic (EO) devices to have an enhanced performance, a high efficiency material in terms of electro-optic coefficient, e.g., $r_{33}$, $2^{nd}$ order susceptibility, $\gamma^{(2)}$ and ability to integrate multiple functionalities on a chip, with available manufacturing/fabrication technology, is necessary for creating smart and high performance devices. The inorganic materials used in the current art, as described previously, poses insurmountable difficulties for monolithic fabrication of multifunctional devices. The biggest problem, that these materials are not compatible for monolithic fabrication, arises from the fact that they require very high temperature processing, beyond the range of lithography process. Further, commonly used materials such as $LiNbO_3$ and ZnTe have a smaller electro-optic coefficient, thus the device performance is limited by material constraints. Because of these limitations, $LiNbO_3$ and ZnTe are also not good terahertz generators.

On the other hand EO dendrimer can achieve several times higher EO efficiency compared to $LiNbO_3$ and simultaneously can be fabricated on a chip allowing a highly reliable packaging. Additionally, the monolithic fabrication route allows the waveguide based components to be integrated with other on-chip functionalities, thereby opening a door for a number of important chip based devices. However, an important issue is to dope dendrimer with an appropriate dopant to obtain a multifunctional material suitable for waveguide core. For instance, doping with $Er^{3+}$ produces optical amplification and doping with a noncentrosymmetric additive (e.g., a chromophore) enhances its EO efficiency and susceptibility that is necessary for terahertz generation.

I.B. Lithography Process/Issues

One of the problems in lithography process is that of obtaining a precise etching geometry of the waveguide. Lithography process for waveguide fabrication involves the following steps as shown in U.S. Patent Application Publication No. 2005/0002628, published on Jan. 6, 2005 by Rahman et al. and in U.S. Ser. No. 11/862,474, entitled "Dendrimer Based Terahertz Generator", filed on Sep. 27, 2007, which are herein incorporated by reference. First a layer of cladding material is deposited on the wafer. This is done by using a spin-on-glass and/or a dendrimer. This is the lower part of the cladding. Second, once the lower cladding is cured, a layer of functional material is deposited on top of the lower cladding layer. This functional layer is a functionalized dendrimer. Third, this second layer is etched to make the core of the waveguide. Fourth, another layer of a cladding material is deposited on top of the core layer. Before etching the core, a photoresist is spun on the core layer on which a selected pattern is imprinted from a mask by UV exposure. The exposed wafer is then rinsed in acetone to wash away the unexposed portions of the resist that generates the device pattern on the wafer.

Referring to FIG. 1, there is shown an exemplary detailed structure of a THz waveguide 100. THz waveguide 100 includes a substrate 110 upon which the remaining layers are built upon. A top 180 and a bottom electrode 181 are placed on either side of a waveguide cladding 190 and 191, respectively. The electrodes 180 and 181 provide a means by which an external electric field can be applied to the THz waveguide 100. The cladding layers 190 and 191 and a core 120 are deposited by the procedure described above and in the previously cited applications and patent that were incorporated herein by reference. A spin-on indium tin oxide or other suitable conductive nanomaterials or metals can be deposited by spin coating or by evaporation or by sputtering to form bottom electrode 181. The top electrode 180 was also deposited by a similar process as the bottom electrode 181 and subsequent patterning via common lithography using a mask. A cover layer 130 covers a top electrode 180 with an unspecified refractive index After this, the wafer is subjected to a reactive ion etching that takes the materials away in a layer by layer fashion from the top of the entire wafer. Consequently, waveguide ridges are generated on the wafer as the resist and dendrimer materials are removed. A key factor here is the etching selectivity of the resist to dendrimer. For instance, common polymer based resists make approximately 1 (one) micron film while the dendrimer (core) layer is from 3 to 5 micron thick. If a given design requires, say a 5 micron ridge depth (in which case dendrimer layer must be 5 micron thick), then a resist to dendrimer selectivity must be of 1:5. The factors that determine the selectivity are primarily the etching agents (gases), their concentration and pressure in the reactor, duration of etching, and the applied rf power of the RIE machine. There is a delicate balance of these variables to achieve a smooth, high quality waveguide that must be determined by design experiments (aka tedious trial and error) method. For instance, while a higher pressure or a higher concentration of particular gas (e.g., chlorine) may attack the dendrimer more vigorously than the resist (thus favoring a higher selectivity for dendrimer), it may result in rough or non-uniform edges that will in turn be detrimental for waveguide performance.

A way to solve this problem is to use a metal based resist (also known as hard mask, e.g., chrome or nickel) in place of a common polymer based resist (soft resist) such as Shipley 1800 series. Because the etching rate of metal based resist (hard resist) is slower than the soft resist, it will produce a deeper etch depth. The main waveguide geometries required for the inventive devices are linear, bent, slab, array, circular, elliptical, and taper.

Another way to achieve a deeper etch in a dendrimer film is to use a lift-off process. Here a metal layer is deposited on top of the resist after the resist is exposed to UV but before it is developed. Thereafter, the wafer is rinsed in acetone and all the unexposed photoresist, and overlying metal is washed away, because, only the exposed photoresist hardened during UV mask alignment. Finally, a reactive ion etching (RIE) is performed on the wafer and the dendrimer is etched to the required depth per design. The result from this processing is that, where the UV was exposed, a layer of photoresist is produced, and an overlying layer of metal. The surrounding regions are etched dendrimer. Now the task is to remove the patterned photoresist/metal layer(s), which is called lift-off or wet resist-stripping process. This is done by using a strong acid such as sulfuric acid ($H_2SO_4$) or (or sulfuric acid in combination with an oxidant like chromium oxide ($Cr_2O_3$)), which dissolves the developed resist. If, earlier, the resist was not baked at too high a temperature or too long, even acetone can be used for lift-off. These solvents will remove the photoresist/metal and the end product will be patterned dendrimer on a wafer. Then the wafer is subjected to the reactive ion etching to obtain a predetermined etching depth of the film. The remaining metal is then removed by a wet chemical washing.

I.C. Electro-Optic Poling

A key factor for a EO sensor is the electro-optic parameters for a given material. These are the electro-optic coefficient and magnetic susceptibility. These factors depend on the concentration of the dipoles or dipole moments of a non-linear optical material (NLO) and their proper orientation. Dendrimer is a suitable material for this purpose because its electro-optic properties can be enhanced by doping or conjugating dopant molecules.

However, to maximize the above mentioned electro-optic properties, a high field poling is necessary at an elevated temperature, near its glass transition. This process is referred to as corona poling or simply poling. A modified prism coupler setup, as described and shown in U.S. Ser. No. 11/862,474, entitled "Dendrimer Based Terahertz Generator", filed on Sep. 27, 2007, which is herein incorporated by reference, can be used for electro-optic measurements. An incident laser is coupled to the waveguide core via a prism (e.g., gadolinium gallium garnet or rutile prism). The transmitted (coupled) laser is measured with a detector to investigate the effects of an external modulating bias and/or temperature and/or other variables such as humidity, gaseous media, etc. A fiber coupled collimator can also be used to monitor any deviation of wavelength as a function of temperature and/or applied bias. Once the film is optimized by poling, it can be used as an EO sensor.

II. Exemplary Material Selection and Preparation

Electro-optic properties are important for many photonic devices that generally exploit the non linear optical parameters such as electro-optic coefficient (EOC), $r_{33}$, and the second order susceptibility, $\chi^{(2)}$. These devices include THz emitter, optical modulator, and electro-optic sensors, among others. Dendrimers are a class of star burst polymers with nearly spherical, monodispersed molecular architecture. Unlike side chain polymers, dendrimer structure is characterized by three distinct features: (i) a central multifunctional core, (ii) tiers or "generations" of multifunctional repeat units attached around the core, and (iii) terminal or end groups, that are also multifunctional. For instance, for poly(amido amine) (PAMAM) dendrimer, generation 0 (G0) through generation 10 (G10) have been demonstrated where the molecular size varies from ~1.5 nm for G0 to ~13.5 nm for G10. Manipulating the structural features allows a controlled enhancement of optical and electro-optic properties of these end-functionalized macromolecules. For instance, when chemically complexed (doped) with a dopant such as a chromophore, dendrimer's nonlinear optical properties can be enhanced significantly. It is also known that dendrimers form a self-assembled multilayer on substrates whose thickness can be controlled by manipulating the dendrimer generation and solution chemistry. Because of their highly organized structure, dendrimers form high quality films that are suitable for lithographic fabrication of high quality waveguides and waveguide based photonic devices. These properties can be exploited for a number of potential applications including solid state laser, electro-optics, and photonic integrated circuit. Because dendrimer is suitable for liquid phase doping, its EOC can be enhanced significantly above its intrinsic value. Simultaneously dendrimer can be processed at relatively lower temperatures allowing integration with other functionality via lithography process.

Figure 2:
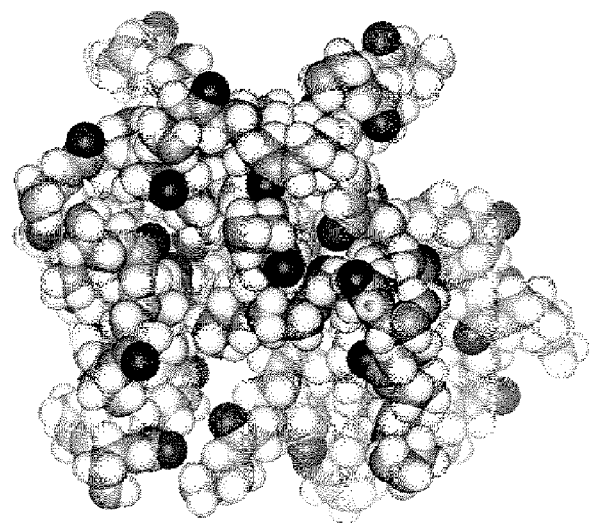
FIG. 2 is a 3-D rendering of a frozen-in time, Generation 3, dendrimer molecule.
Figure 3:
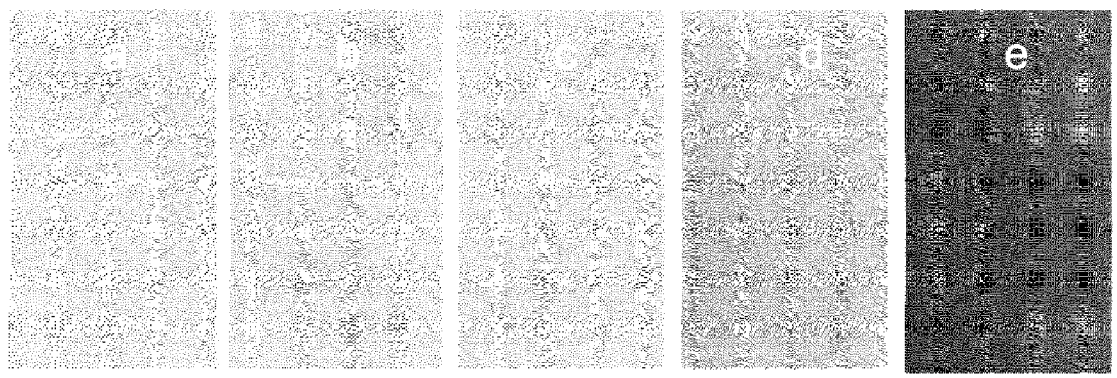
FIG. 3 exhibits dendrimer film of different composition on glass slides with varying refractive index demonstrating the natural index contrast in accordance with the invention.

Dendrimer can also be complexed with other impurities to obtain properties such as optical amplification. In addition to planar waveguide, dendrimer can also be used to fabricate photonic crystal based waveguides. A 3-D rendering of a frozen-in time, Generation 3, dendrimer molecule is shown in FIG. 2. Discussed now are details of dendrimer film formation, doping, poling and EOC measurements.

Poly(amido amine) (PAMAM) and poly(amidoamine organosilicon) (PAMAMOS) dendrimer (Dendritech, Inc., Midland, Mich.) were used for the present investigation. PAMAMOS dendrimer is essentially a Polyamidoamine (PAMAM) dendrimer with the end groups complexed by (3-acryloxypropyl)-trimethoxysilane (TMOS). For dendrimer doping, a few considerations are important in choosing a suitable chromophore. Commercially available chromophores were reviewed that produce a higher NLO property because this route can produce faster results than developing a new chromophore. Also, unlike many side-chain polymer based guest-host system where a higher chromophore loading is required to achieve appreciable NLO characteristics, dendrimer is expected to require relatively lower doping concentration to achieve higher electro-optic properties. This is because dendrimer itself being a polar molecule favors higher dipole formation via its charge centers. PAMAMOS dendrimer has a functional group with relatively high affinity towards amine ($NH_2$) and hydroxyl (OH) groups. Alizarin (1,2-dihydroxyanthraquinone, $C_{14}H_8O_4$) has a suitable structure for complexing with dendrimer (doping) because its phenolic OH will interact with the PAMAMOS amine. However, the hydrogen bonding complex formation of a chromophore with the PAMAMOS requires an amine to provide the proton transferred species. Therefore, any generation of PAMAMOS is expected to allow a better environment for chromophore-dendrimer dipole formation. Alizarin (Alfa Aeser) is a good choice as the dopant because it is a non-linear chromophore with a linear hyperbolarizability and an absorption maxima ~609 nm. This is important for using dendrimer as a THz emitter. Because an electro-optic THz emitter is pumped by a femto second laser in 800 nm wavelength range having the absorption maxima significantly below this range helps avoiding problems like photo degradation. As a small molecule, alizarin not only can complex with the surface amine groups, but it can also fit in the interstitial space of a dendrimer molecule, thus help a uniform doping concentration.

In PAMAM dendrimer the chromophores may be attached to the end groups or may be contained inside the molecular cavity because of the secondary amine groups. Although PAMAMOS provides similar environment, it is more likely to conjugate the alizarin molecules within the molecular cavity because most of its surface amines are already taken by TMOS molecules. Also, for effective loading, it is not essential for the chromophore molecule to complex (chelate) with the chelating sites in PAMAMOS matrix, because, attractive force between the chelating sites and one of the functional groups in the chromophore should suffice for uniform doping. Thus dendrimer provides a suitable environment for selective doping and enhancement of NLO properties.

Prior to poling, a dendrimer is doped with a chosen dye or dyes from at least one of the following non-linear organic chromophores:

(2,6-Dimethyl-4H-pyran-4-ylidene)malononitrile;
(S)-(−)-1-(4-Nitrophenyl)-2-pyrrolidinemethanol;
[4-[Bis(2-hydroxyethyl)amino]phenyl]-1,1,2-ethylenetricarbonitrile; 1-Docosyl-4-(4-hydroxystyryl)pyridinium bromide;
2-(Dimethylamino)vinyl-1-nitronaphthalene;
2,3,5,6-Tetrafluoro-7,7,8,8-tetracyanoquinodimethane;
2-[[5-(Dibutylamino)-2-thienyl]methylene]-1H-indene-1,3 (2H)-di one;
2-[4-((4-(Bis(2-hydroxyethyl)amino]phenyl)(cyano)methylene]-2,5-cyclohexadien-1-ylidene]malononitrile;
2-[4-(Dimethylamino)styryl]pyridine;
2-[Ethyl[4-[2-(4-nitrophenyl)ethenyl]phenyl]amino]ethanol;
2-Amino-3-nitropyridine;
2-Amino-5-nitropyridine;
2-Aminofluorene;
2-Chloro-3,5-dinitropyridine;
2-Chloro-4-nitroaniline;
2-Methyl-4-nitroaniline;
2-Nitroaniline;
3-[(4-Nitrophenyl)azo]-9H-carbazole-9-ethanol;
3-Methyl-4-nitropyridine N-oxide;
3-Nitroaniline;
4-(Dibenzylamino)benzaldehyde-N,N-diphenylhydrazone;
4-[4-(Dimethylamino)styryl]-1-docosylpyridinium bromide;
4-[4-(Dimethylamino)styryl]pyridine;
4-Dimethylamino-4¢-nitrostilbene;
4-Nitroaniline;
5-Nitroindole;
5-Nitrouracil;
7,7,8,8-Tetracyanoquinodimethane;
9-Ethyl-3-carbazolecarboxaldehyde-N-methyl-N-phenylhydrazone;
Disperse Orange 25;
Disperse Orange 3;
Disperse Red 1;
Disperse Red 13;
Disperse Red 19;
Disperse yellow 7;
Ethyl 4-(dimethylamino)benzoate;
Gentian Violet, ACS reagent;
Gentian Violet;
N-(2,4-Dinitrophenyl)-L-alanine methyl ester;
N,N-Dimethyl-N¢-[(5-nitro-2-thienyl)methylene]-1,4-phenylenediamine;
N-[3-Cyano-3-[4-(dicyanomethyl)phenyl]-2-propenylidene]-N-ethyl-ethaniminium inner salt;
Nile Blue A;
Alizarin
N-Methyl-4-nitroaniline;
trans-4-[4-(Dimethylamino)styryl]-1-methylpyridinium iodide; and
trans-4-[4-(Dimethylamino)styryl]-1-methylpyridinium p-toluenesulfonate.

Figure 4:
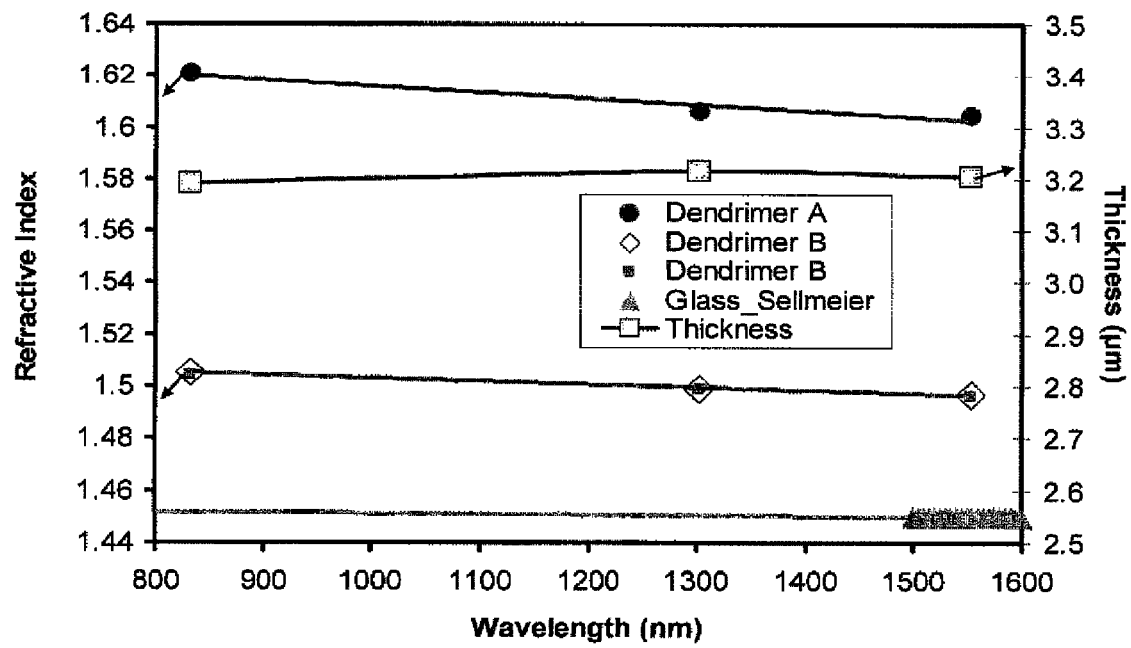
FIG. 4 exhibits measured refractive indices of samples of FIG. 3.

Several dendrimer films' refractive index is shown in FIG. 4. These films were formed either by spin coating or simply by dispensing solution on glass slides and then curing them on a hot plate in ambient atmosphere. The curing process was optimized with a goal of subsequent lithography and etching of these films.

For refractive index measurements, same solutions were spun on silicon wafers. Both glass slide and wafer were cured simultaneously with identical curing profile. Refractive indexes of the films on wafer were measured with a Metricon 2010. Films 4 (a)-(d) are undoped dendrimer where the refractive index has been varied from 1.45 to 1.64 via natural index contrast effect as described in U.S. patent application Ser. No. 10/710,303, filed Jul. 1, 2004, which was published as US 2005/0002628 on Jan. 6, 2005; U.S. patent application Ser. No. 11/335,110, filed on Jan. 19, 2006; and U.S. Pat. No. 7,110,627, issued on Sep. 19, 2006, all of which are herein incorporated by reference. For electro-optic measurements, Alizarin doped dendrimer film were prepared by spin coating on silicon wafer or on glass. FIG. 4(e) shows a film formed from dendrimer doped with 3 wt % alizarin before poling; this film has a refractive index ~1.52. All films were cured at a temperature between 100° C. and 200° C. using a multi step ramp and soak protocol.

Figure 8:
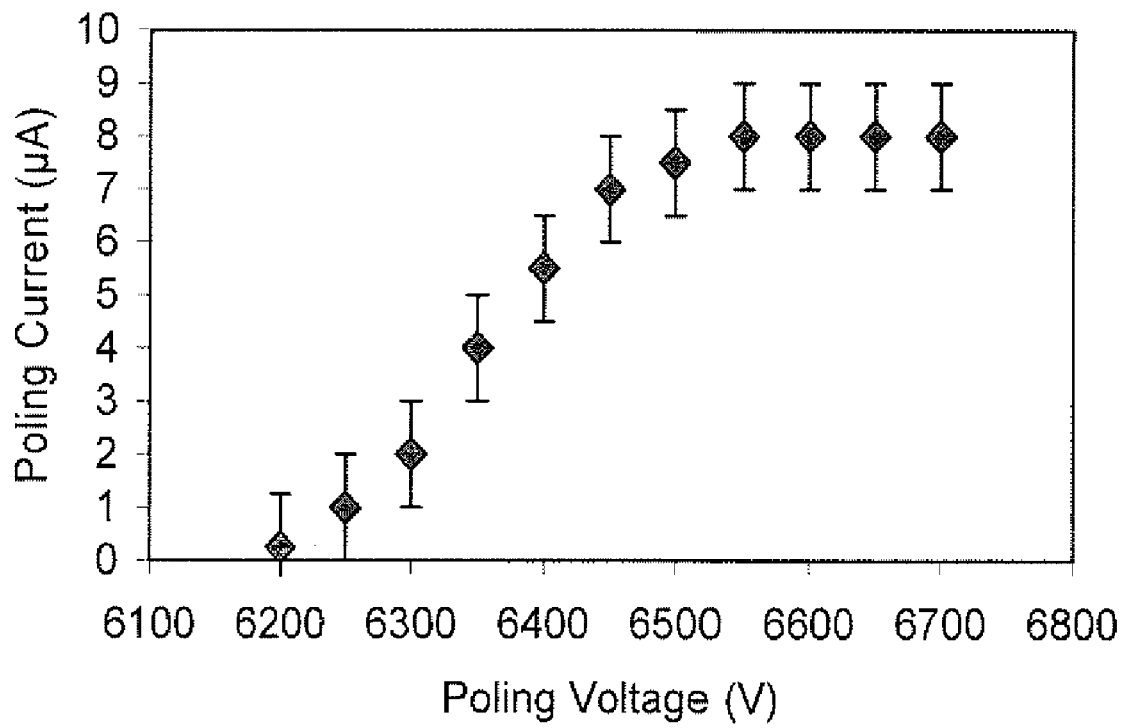
FIG. 8 shows the poling current as a function of applied voltage in accordance with the invention.

Referring now to FIGS. 5-10, the objective of poling is to optimize the dipole alignment of the cured film. Like other polymer films, the value of non-zero $\chi^{(2)}$, and therefore, $r_{33}$, depends entirely on the dipole orientation. To the first approximation, when the aligning field is static, the average orientation depends on the poling field strength, $E_p$. There are a number of poling techniques that have been deployed by other investigators. These are: solid or liquid contact electrode poling, all-optical poling, photo assisted poling and corona poling; all can break the molecular centrosymmetry to produce non-zero nonlinear effect. Here a corona poling was deployed because of the geometrical simplicity of the method and also to avoid complicacies associated with contact electrode poling. For contact poling, electronic conduction within the polymer layer has been identified in many polymers; even a very small conduction current will result in an incomplete (non-efficient) orientation of the dipole moments. It has been previously shown that there are three regions of conduction as a function of applied field for Disperse Red 1 doped PMMA polymer where contact electrodes of ITO and gold were used on either sides of waveguide. Using the film, it has been found that for ~1.44 µm thick active layer cladded between two layers of $SiO_x$ [derived from poly(methyl siloxane)], an Ohmic conduction exists below 25 V/µm. Between 25 and 100 V/µm, conduction via Schottky thermionic emission is dominant while a further higher field may generate larger current via Fowler-Nordheim tunneling. However, the presence of any of these conduction processes will result in a significantly higher current than observed for the present samples as shown in FIG. 8.

Figure 5:
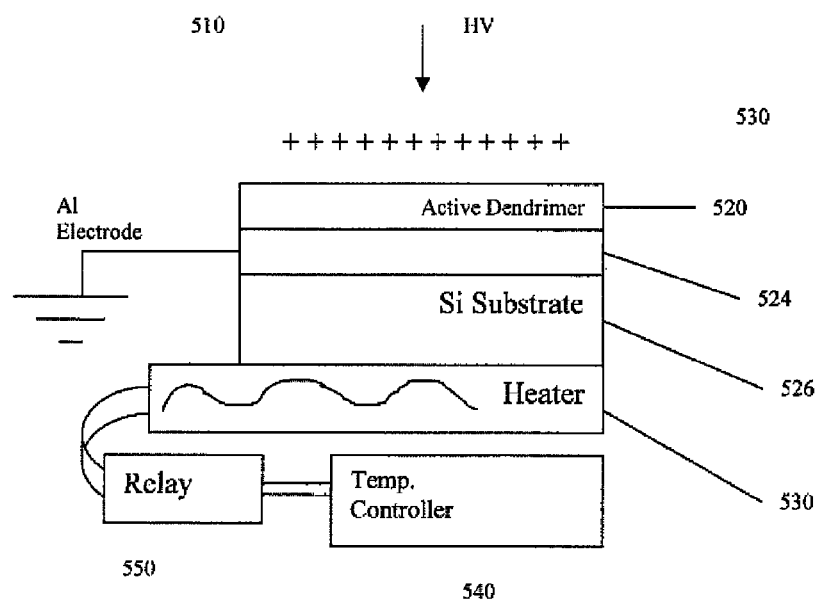
FIG. 5. shows a sample simple poling configuration.

A controlled corona poling was conducted with a needle electrode with the above mentioned side effects in mind. To our knowledge this is the first poling results for the PAMAMOS dendrimer film. The sample configuration 500 is shown in FIG. 5. The high voltage needle electrode 510 was placed 1 cm above a sample surface, namely, dendrimer 520. Dendrimer layer 520 has an electrode layer 524 below it and electrode layer 524 is situated on a silicon or glass wafer 526. Sample temperature was raised at a rate of 4° C./min and held at 110±1° C. by heater 530 in conjunction with a temperature controller 540 and relay 550. In some cases the sample was held at 120° C. or 130° C. or higher. It is expected that as the alignment progresses, poling current will increase as a function of applied field. The poling current should stabilize when maximum alignment is reached. Beyond this point, additional applied field would drive the current higher leading to previously observed phenomena and at a further higher field breakdown of the film may occur.

Figure 9:
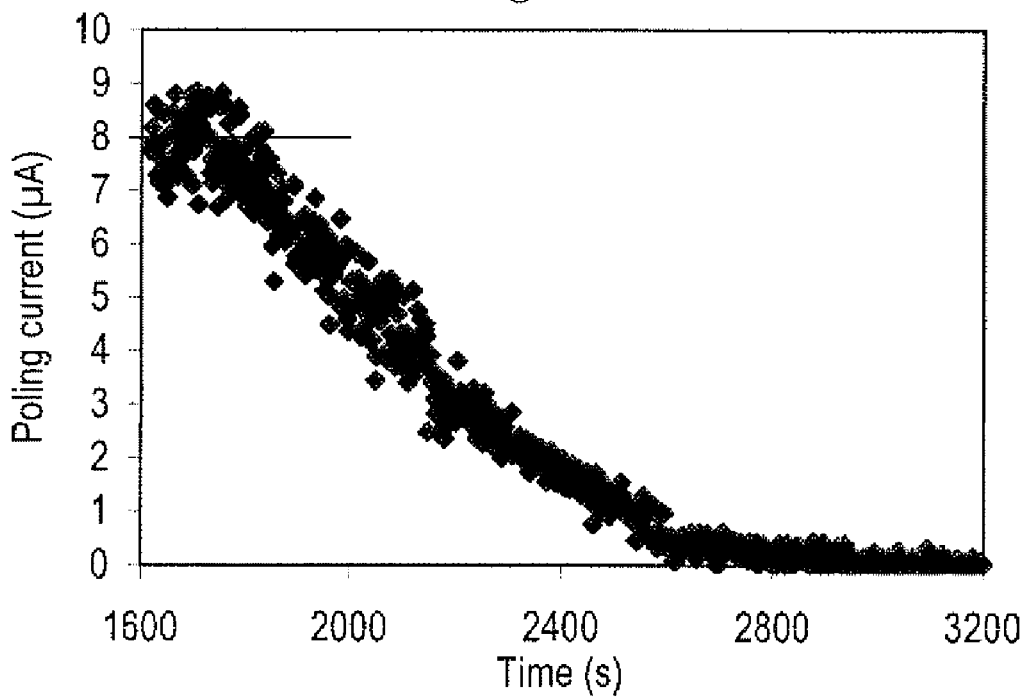
FIG. 9 shows the decay of poling current at applied voltage as the temperature cools off from ~Tg to room temperature in accordance with the invention.

It was observed that the onset of producing a measurable current at 110° C. is >6 kV of applied voltage for the configuration used. Traces of temperature and poling current were monitored during the entire period to examine the poling condition. Voltage was increased at a step of 50 V and the resulting current was recorded. As seen in FIG. 8, the current increased as the voltage was raised above the threshold and stabilized at 8±1 µA at an applied voltage of 6600±100 Volts. Since the film thickness is 100 µm, this corresponds to a field strength of $6.6 \times 10^5$ V/cm. Current remained steady at the maximum applied voltage at a fixed temperature indicating an optimum alignment. Optimum stable poling current (at an applied voltage of 6700 Volts) was maintained for ~30 minutes to allow for the orientation of the dipoles. At that point, while still the high voltage was being applied, the heater 530 was turned off. As expected, the current subsided as the temperature slowly reached to room temperature as shown in FIG. 9. The absence of a higher poling current indicates that this current is not due to the internal conduction within the dendrimer film 520. This procedure thus ensures that a proper poling has been achieved and that the dipoles remain oriented after poling.

Usually a Teng-Man type setup can be used for a direct measurement of the electro-optic coefficient (EOC). In general, a laser beam is reflected off of the poled dendrimer film that is sandwiched between two electrodes via which a low frequency modulation is applied. The modulated beam is detected and monitored by a lock-in amplifier at the modulation frequency.

Figure 6:
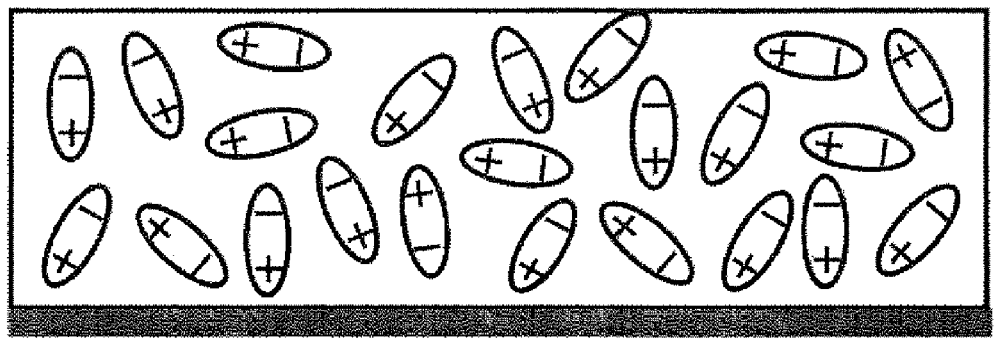
FIG. 6 shows the molecular orientation of unpoled dendrimer in accordance with the invention.
Figure 7:
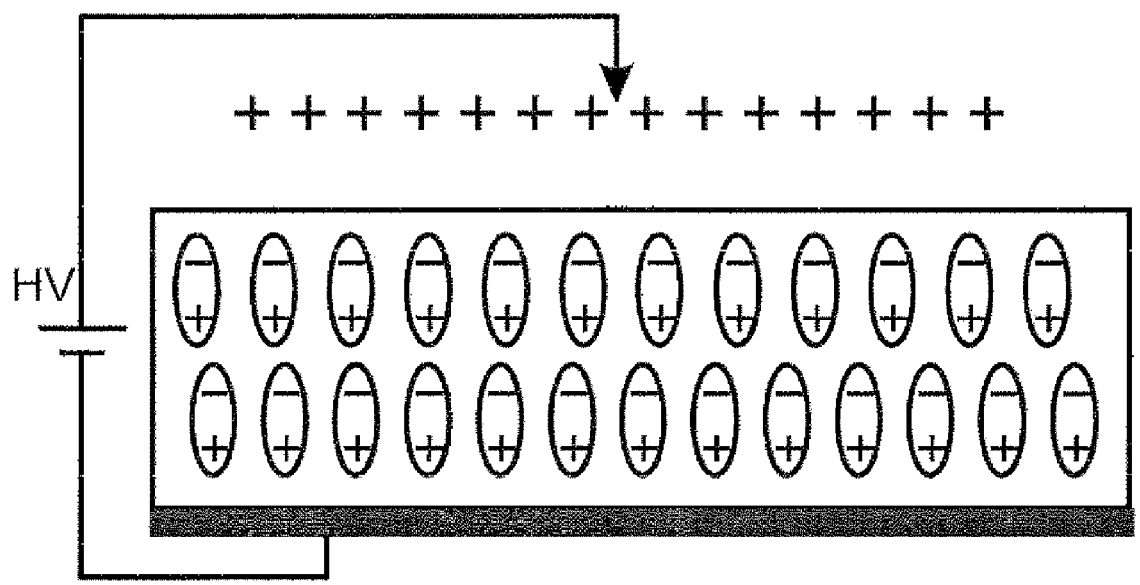
FIG. 7 shows the molecular orientation of poled dendrimer in accordance with the invention.

However, an alternative method can also be used by measuring refractive index change due to poling. Here, the index of dendrimer films is measured before and after poling by a prism coupler (Metricon 2010). The linear Pockels effect is used to deduce the $r_{33}$ parameter from measured refractive index change between unpoled and poled film. As shown in FIG. 6, the orientation distribution of the dipole moments of cured polymer film is isotropic. Hence the index ellipsoid is a sphere. After poling, see FIG. 7, the isotropy is broken and the poled film becomes a uniaxial polar material with a changed refractive index. The index difference, $\Delta n$, is related to the EOC via the poling field $E_p$ as, $$|\Delta n| = \frac{1}{2} n^3 r_{33} E_p \quad (2)$$

Figure 10:
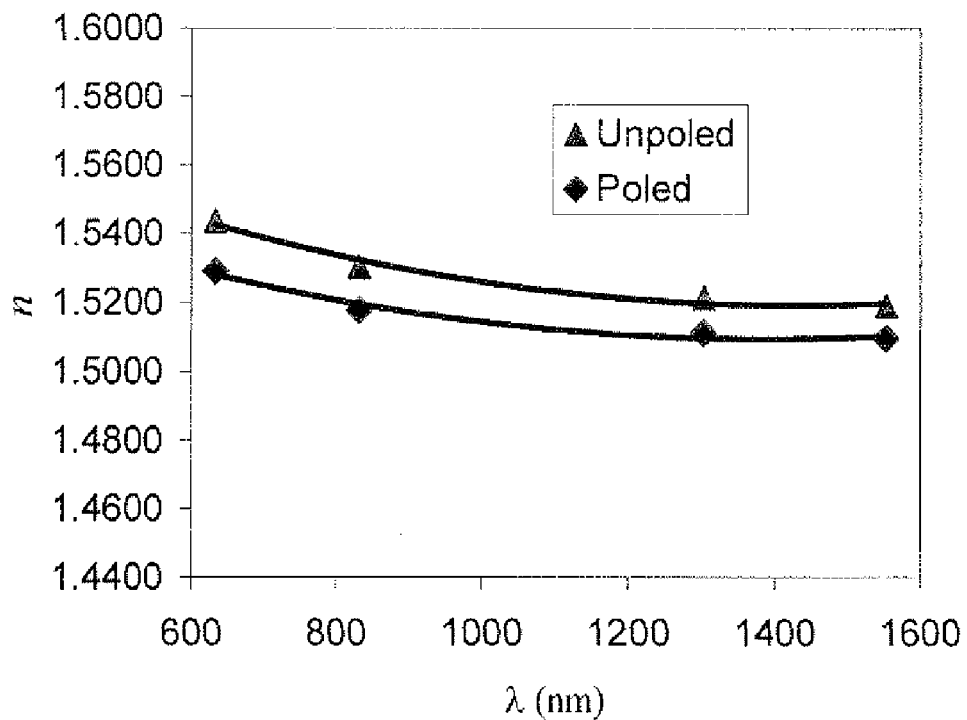
FIG. 10 shows the refractive index variation as a function of wavelength of dendrimer film before and after poling in accordance with the invention.
Figure 11:
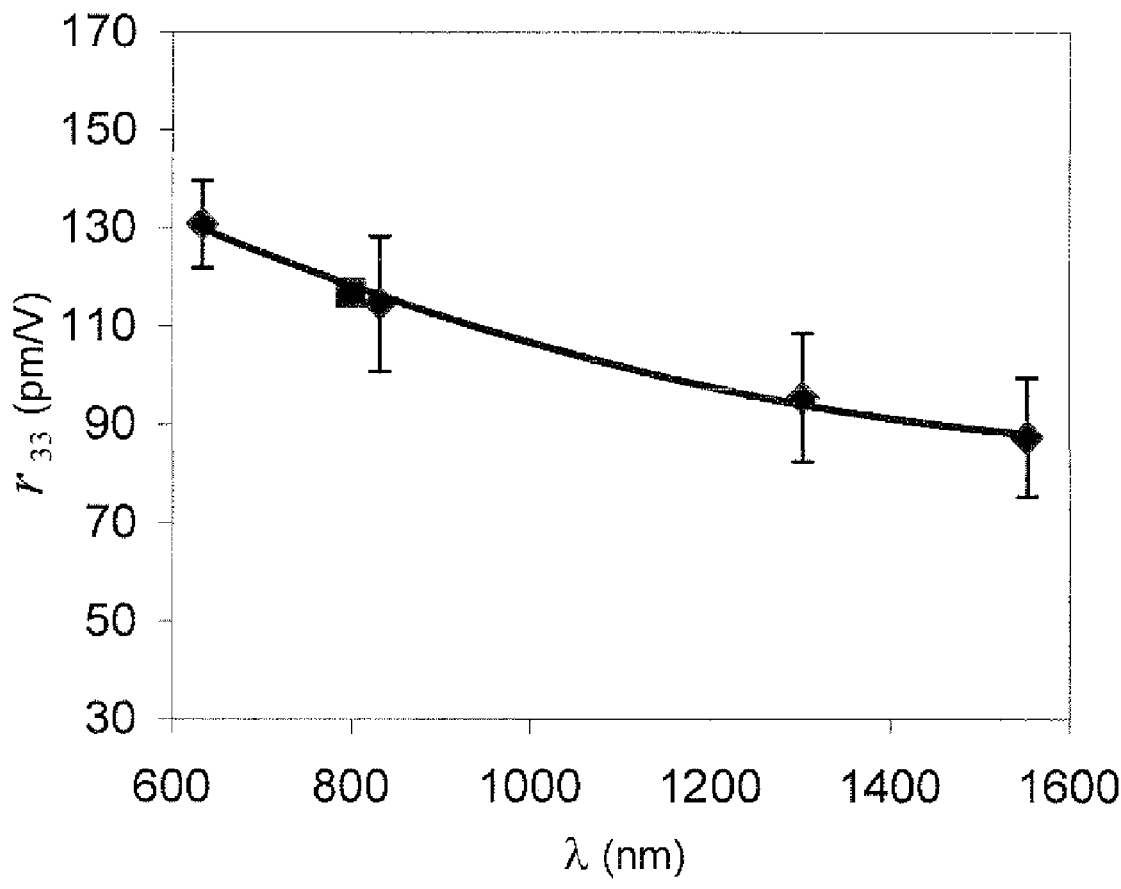
FIG. 11 shows the calculated electro-optic coefficient, $r_{33}$, as a function of wavelength in accordance with the invention.

FIG. 10 shows the measured refractive index (RI) of both poled and unpoled films at room temperature as a function of wavelength. A systematic difference in refractive index has resulted due to poling. This difference is utilized in Eq. (2) to compute $r_{33}$; a value of ~130 pm/V was obtained at 633 nm falling to ~90 pm/V at 1553 nm. See FIG. 11 for graphical representation. While this value is significantly higher than inorganic crystalline materials, e.g., $LiNbO_3$, however, an even higher value, ~300 pm/V is expected via optimizing the doping and poling process. Poling arrangements and measurements are shown for in-situ electro-optic poling and laser coupling to the electro-optic dendrimer film on a substrate in U.S. Ser. No. 11/862,474, entitled "Dendrimer Based Terahertz Generator", which is herein incorporated by reference.

III. Exemplary Devices and Use

As shown in the figures below, the main parts of a non-intrusive "EO-effects-type" E-field probe are: an EO sensor (e.g., a Mach-Zehnder modulator), a pair or an array of receiving antenna, and the detection circuitry. The antenna is used to sense a high frequency electric field radiated from a source; this induced E-field is used to modulate an optical signal within the EO sensor, and the detection circuit is used to identify the source of the radiation. The sensitivity of the probe depends on the ability of producing a higher modulation depth of an independent light signal passing through the EO sensor that is modulated by the electric field induced at the antenna. Usually this "captured field" is very faint at the receiving antenna owing to the fact that the transmitted signal decays as an inverse function of the distance. Additionally, induced field becomes fainter at higher frequency owing to the skin effect of conducting antenna material. Hence, only effective way to increase the sensitivity of the probe is to increase the modulation sensitivity of the EO sensor. This can be done by deploying a material that has a higher EO coefficient.

Since $LiNbO_3$ has an EO coefficient ~33 pm/V, the output modulation depth for a weak induced field (which may be <1 Volt) is usually under the signal to noise (S/N) ratio of most detectors, giving rise to an upper limit of measurable frequency and distance, or equivalently, the length-bandwidth product. The proposed EO dendrimer nanomaterial is targeted to have an EO coefficient ~300 pm/V; this is expected to boost the sensitivity ~10 times compared to that of a $LiNbO_3$ based EO sensor. In addition, a proprietary design exploiting an array of MZ will further enhance the sensitivity.

It should be pointed out that the main problem with polymeric materials is a higher insertion loss compared to glass. This is where the inventive technology is different compared to other non-linear optical polymers. Dendrimer film exhibit >95% transmission in the 1500 nm range. Additionally, the inventive technology is targeted to add an amplifier on the same chip that will compensate for any on-chip loss.

Figure 12:
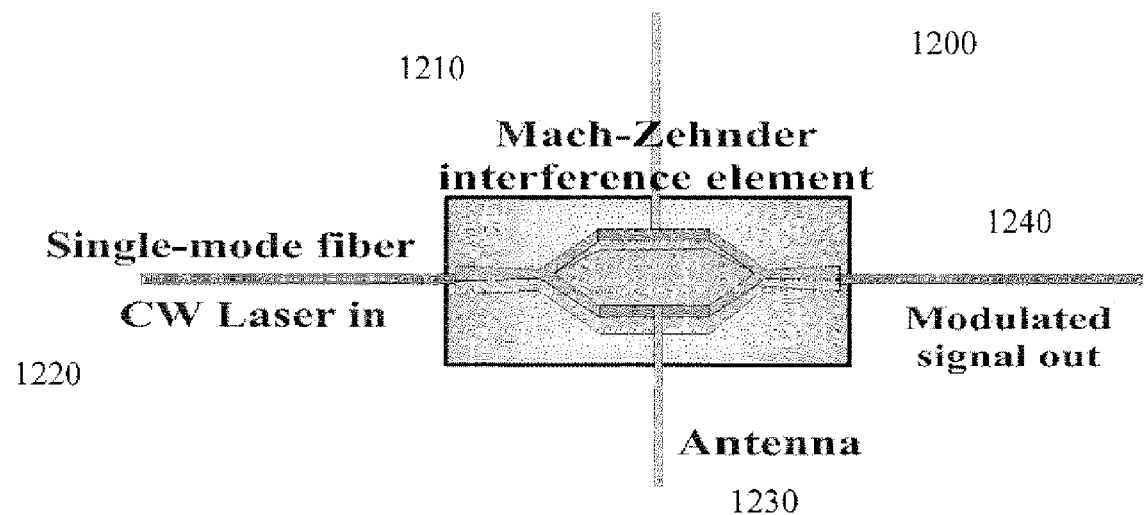
FIG. 12 shows an exemplary schematic for an EO sensor in accordance with the invention.

Referring now to FIG. 12, a schematic for an exemplary EO sensor 1200 for an E-field probe is shown. A Mach-Zehnder (MZ) interferometer 1210 is designed to function as a sensor element. A continuous wave (CW) infrared laser 1220 is transmitted through the MZ interferometer 1210 that is modulated by an electromagnetic field captured from a target by an antenna 1230. From the characteristics of the modulated signal 1240 (e.g., modulation frequency, amplitude, phase, etc.) the identity of the radiating object can be recognized. Currently lithium niobate is used for EO modulator and E-field probe sensors. EO dendrimer is expected to have significantly better performance than lithium niobate and other polymers. This is because of dendrimer's higher EO coefficient and dendrimer's spherical molecular architecture exhibit some special properties not easily available from other materials.

Figure 13:
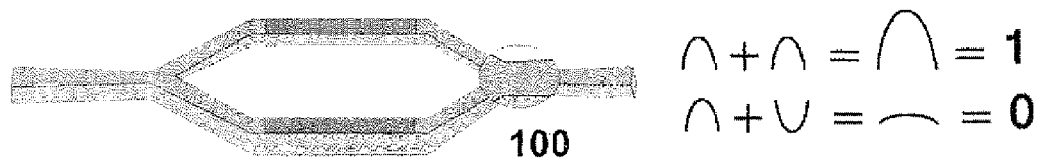
FIG. 13 shows an exemplary Mach-Zehnder interference modulator in accordance with the invention.

Referring now also to FIG. 13, a Mach-Zehnder interference modulator 1300 is functionally illustrated. If the signals coming down each arm of the modulator 1300 are in the same phase at the junction point, then there will be constructive interference at the output, designating a "1". If the signals are out of phase at the junction point, then there will be destructive interference, designating a "0".

Figure 14:
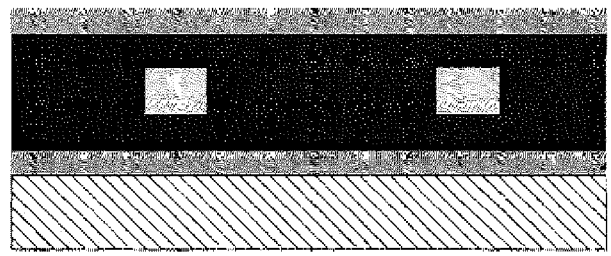
FIG. 14 shows a cross-section of an exemplary Mach-Zehnder interference modulator in accordance with the invention.

Referring now also to FIG. 14, there is shown a cross-section of a Mach-Zehnder interference modulator with electrode arrangements as they may be used in the present invention. This is further described in U.S. patent application Ser. No. 11/335,110, filed on Jan. 19, 2006, which is herein incorporated by reference.

Figure 15:
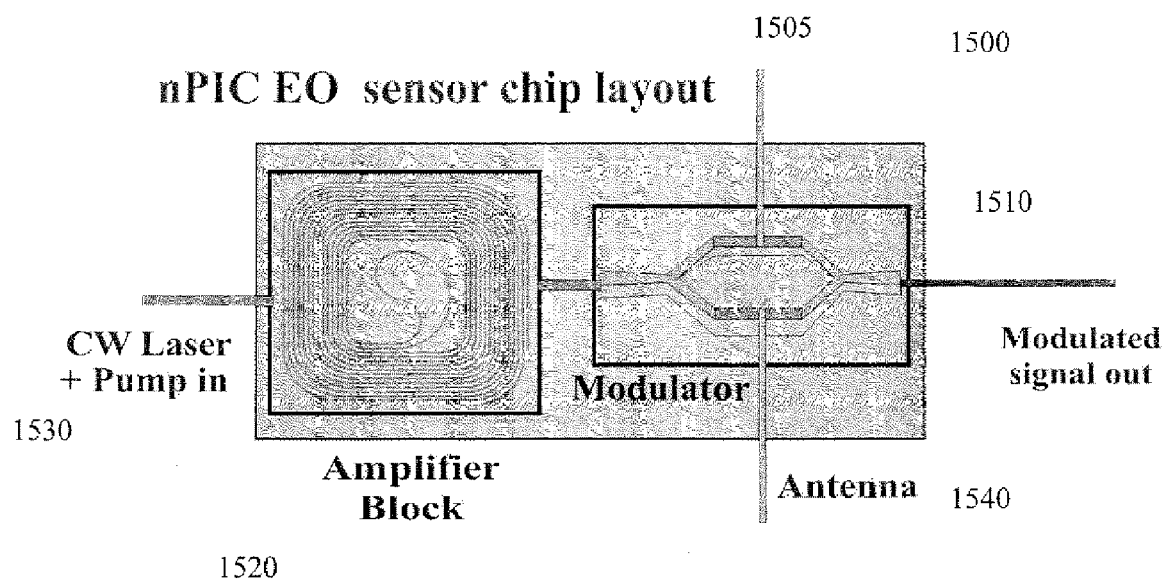
FIG. 15 shows an exemplary EO sensor with an amplifier block in accordance with the invention.

Referring now to FIG. 15, there is shown a sensor chip 1500 which includes a sensor 1505 including a Mach-Zehnder interference modulator 1510 and an antenna 1540, coupled to an amplifier block 1520 to boost the sensor performance for low amplitude fields. The sensor chip 1500 is fed by a CW laser and a pump laser, collectively designated as 1530. Amplifier block is implemented as described in the co-related applications and patents that were incorporated by reference.

Figure 16:
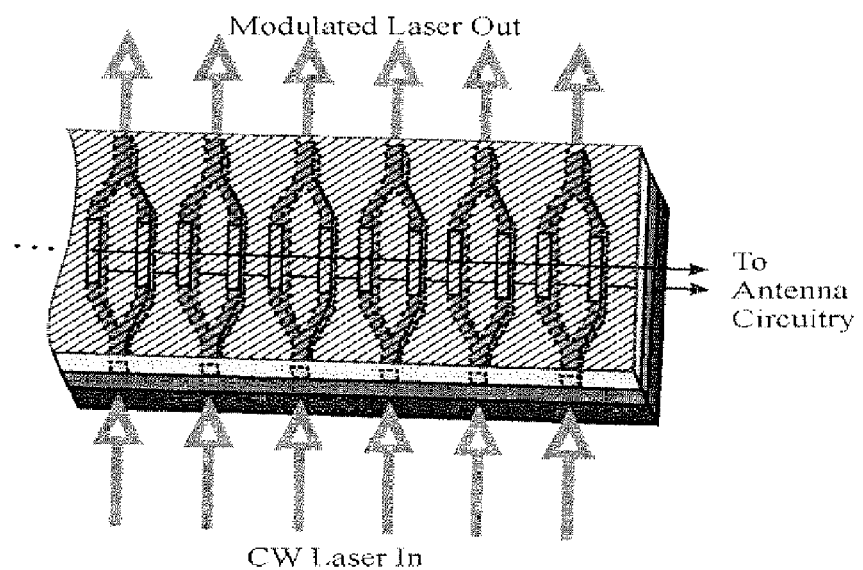
FIG. 16 shows an exemplary array of Mach-Zehnder interference modulators in accordance with the invention.
Figure 17:
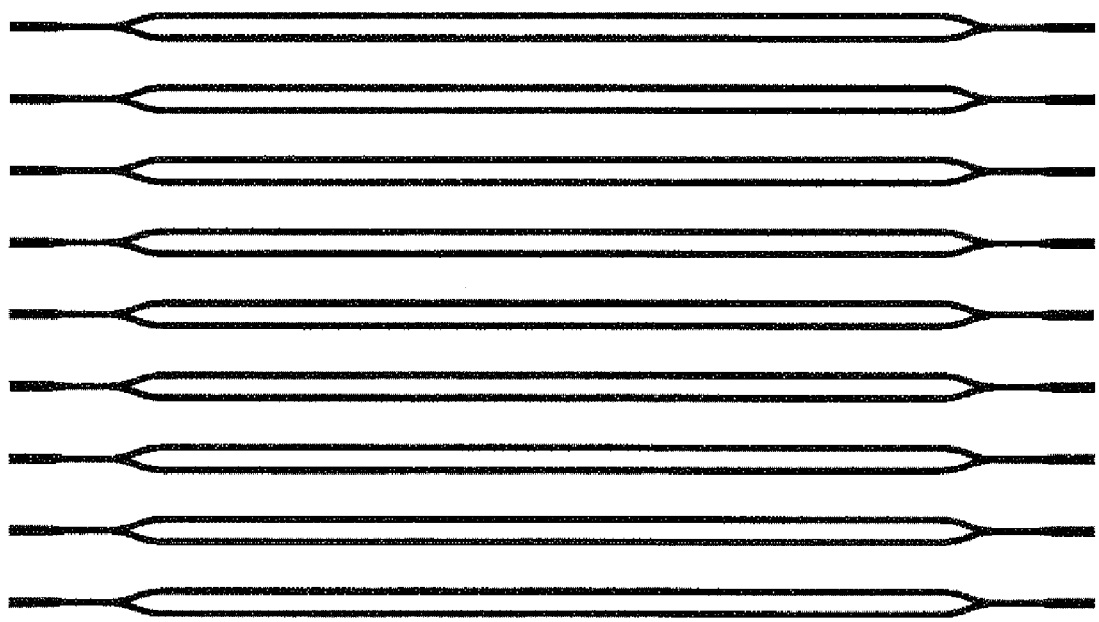
FIG. 17 shows a diagram of an exemplary array of Mach-Zehnder interference modulators in accordance with the invention.
Figure 18:
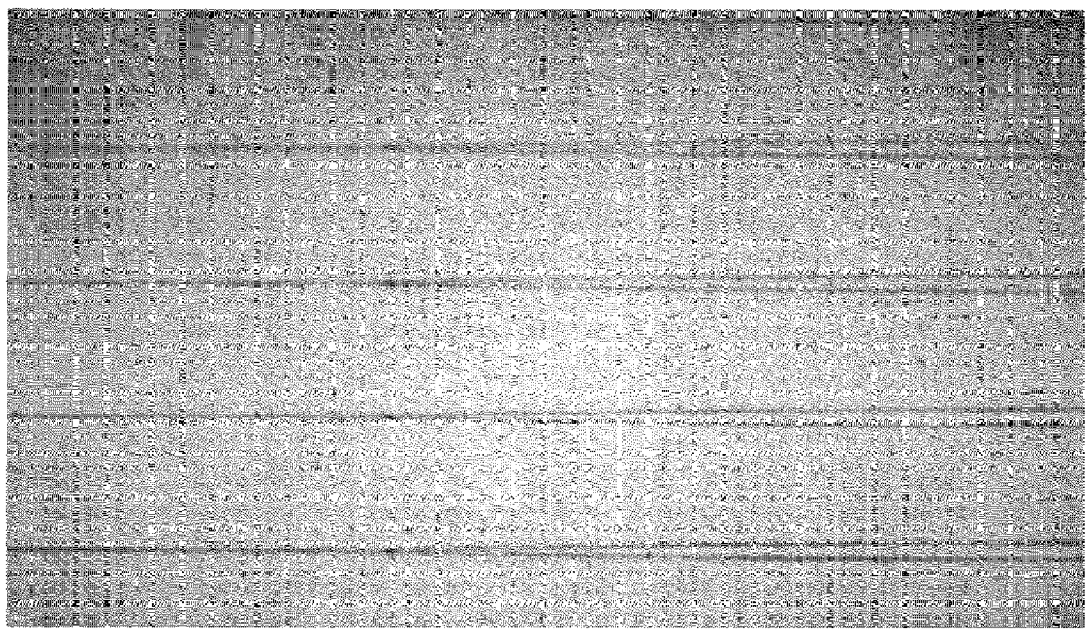
FIG. 18 shows a photo of an exemplary array of Mach-Zehnder interference modulators in accordance with the invention.

Referring now to FIG. 16, there is shown an array of Mach-Zehnder modulators 1600 that can be used to enhance the sensing effect of a sensor chip. The array 1600 will be driven by a tuning circuit comprised mainly of a receiving antenna. The modulated output signal can be analyzed and calibrated for both frequency and distance. Referring now also to FIGS. 17 and 18, there is shown a top view of the array and a photo of an actual implemented array in accordance with the invention.

Figure 19:
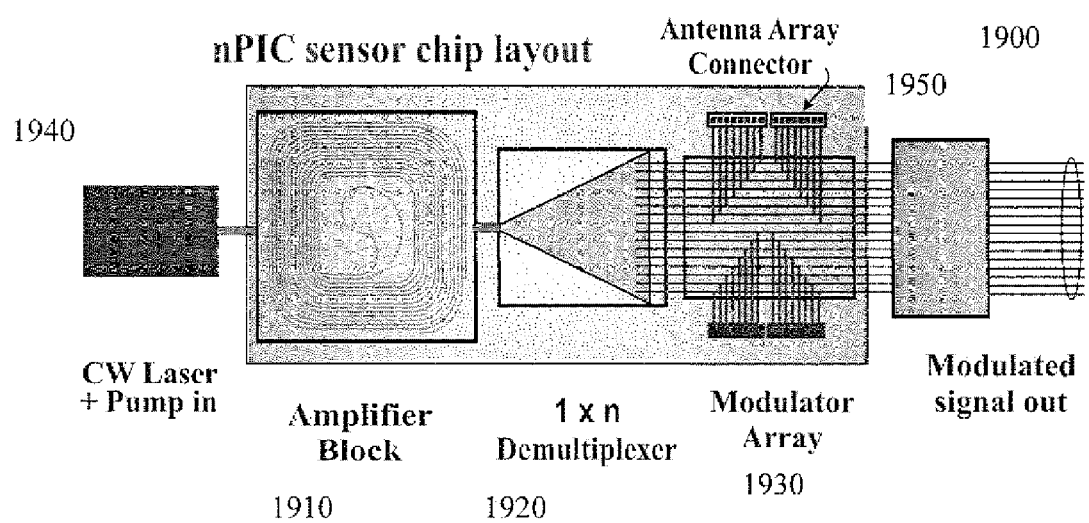
FIG. 19 shows an exemplary nanophotonic chip in accordance with the invention.

Referring now to FIG. 19, there is shown a shown a nano-photonic integrated circuit (nPIC) 1900 comprised of an amplifier block 1910, a 1×n demultiplexer (demux) 1920, and an array of modulators 1930 having an identical number of channels as the demux. The nPIC 1900 is fed with a CW laser and a pump 1940. On the output side, a multifiber array 1950 is used to collect the modulated signals, the array 1950 having an identical number of fibers as the number of channels of the nPIC 1900. These signals are subsequently analyzed to identify the object radiating electromagnetic energy that is collected by an external antenna and fed in to the modulator section. This external electromagnetic signal serves as the modulating excitation to the modulator array.

Figure 20:
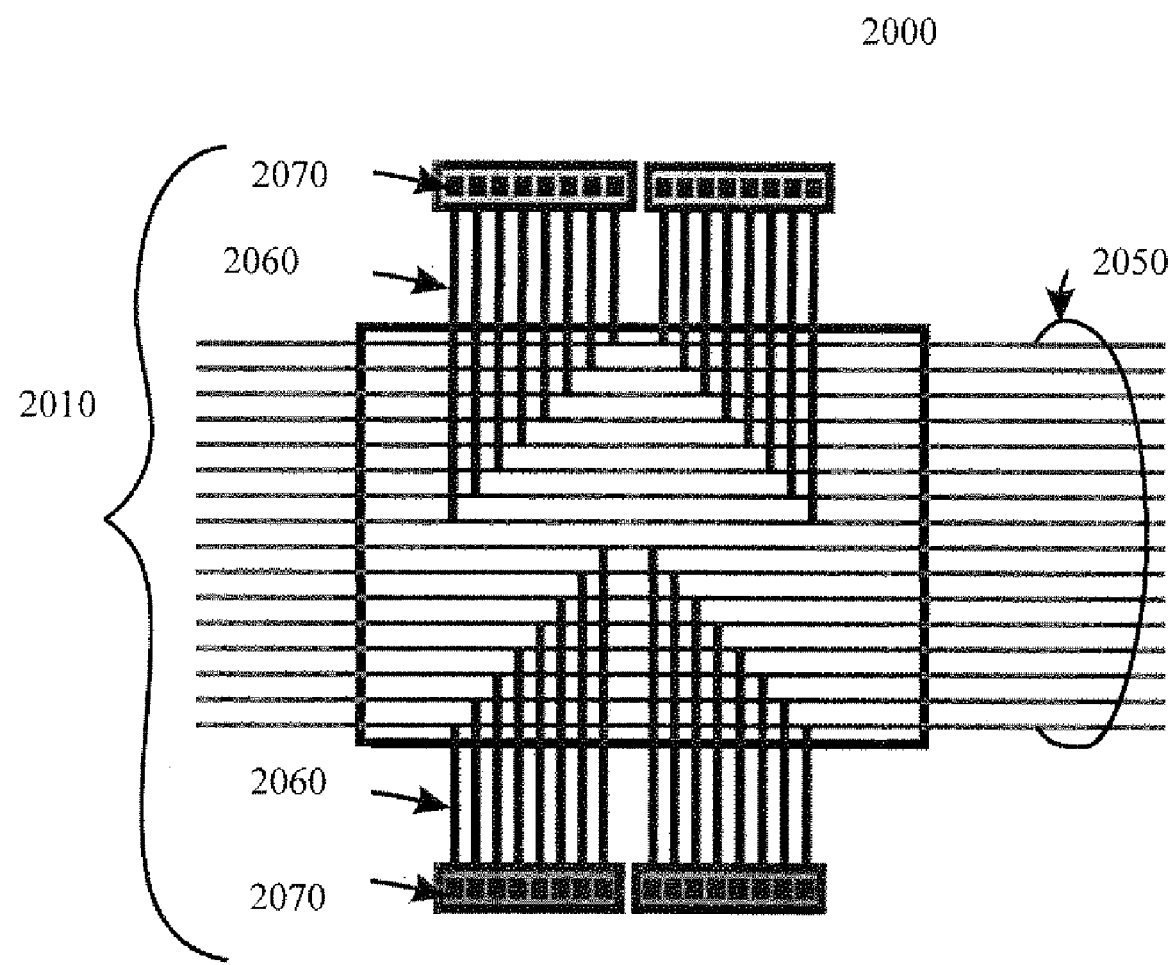
FIG. 20 shows an exemplary connection scheme for the antenna to the chip in accordance with the invention.

Referring now to FIG. 20, there is shown a connector module 2010 that includes metallic connections 2060 that are connected to the electrodes on the modulator array 2050. Connection points or pads 2070 are for actual connections to an antenna that is not shown.

Figure 21:
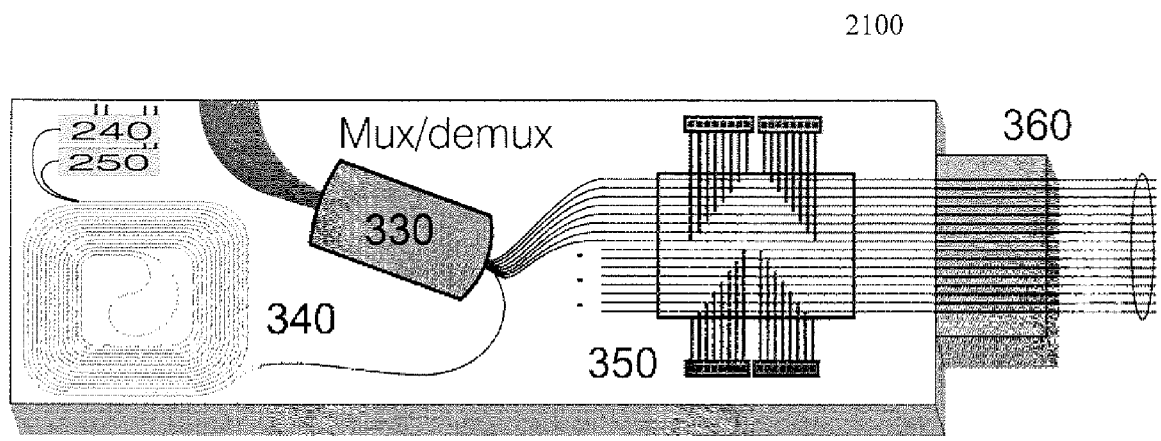
FIG. 21 shows an exemplary transmissive imaging arrangement in accordance with the invention.

Referring now to FIG. 21, there is shown a sensor chip 2100 that includes an amplifier block 340 coupled to a multiplexer/demultiplexer 330. Mux/demux 330 is further coupled to a sensor 350, which in turn is coupled to a modulator array 360. Amplifier block 340 are fed by signal and pump lasers 240 and 250. Operation is similar to that discussed with respect to FIG. 19.

Figure 22:
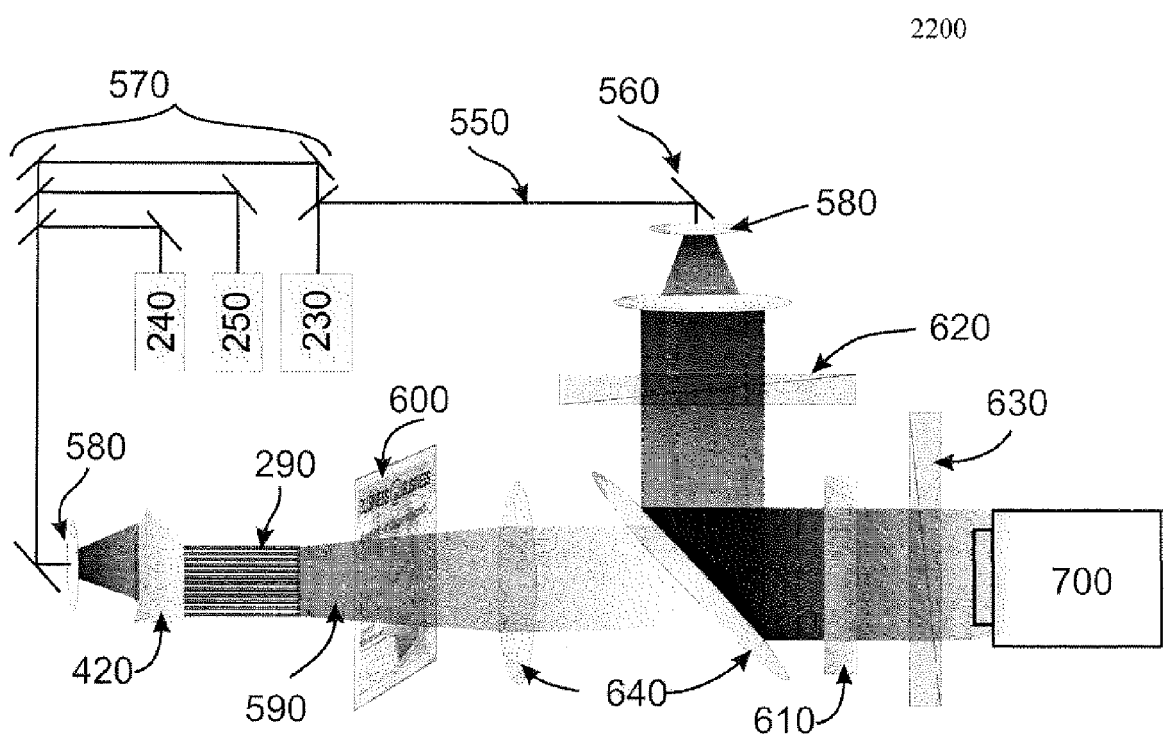
FIG. 22 shows an exemplary reflective imaging arrangement in accordance with the invention.

Referring now to FIG. 22, there is shown a modified CCD microscope based imaging system 2200. System 2200 includes a coupling prism 420 that is coupled to a terahertz source 290, which can be either an array or a bulk emitter, that in turn produces a terahertz beam 590. Lasers 240 and 250 are different wavelength lasers for feeding source 290 via expander 580 and coupling prism 420. Femto-second laser 230 feeds to different parts of system 2200. One branch feeds the source 290, and the other branch is used as a probing beam that is reflected on to the lens system 640 and focused on to the probing sensor 610. That is, lens system 640 is for focusing the THz radiation 590 on to the electro-optic probing sensor 610. Probing sensor 610 is a probing sensor made from high electro-optic efficiency dendrimer. The probing sensor 610 serves as an image interrogator of the object 600. In this case, object 600 is a paper stack with a hidden item. CCD 700 captures the resulting image. A polarizer 620 is placed in the probing beam path and an analyzer 630 is positioned between the probe 610 and CCD 700 such that the CCD sees the same polarization of both probing and signal beams.

Here, a single Ti:Sapphire laser 230 operating nominally in the 800 nm range is used for both pumping the terahertz waveguide 290 and for electro-optic probing (also called electro-optic sampling) for image generation. As mentioned before, an electro-optic sensor 610 is necessary for probing the image carrying terahertz beam. Most of the reported work uses a ZnTe crystal as the probing sensor. However, an amorphous material with appropriate electro-optic property can also be used as a probing sensor. The inventive electro-optic probing sensor can replace ZnTe sensors with an enhanced performance because of its higher sensitivity and resolution.

Imaging can be done in both reflective and transmissive mode. In the configuration shown in FIG. 22, the specimen 600 is placed at the focal plane of the imaging lens. However, this cannot be imaged by visible light or IR. The terahertz rays 590 that transmit through the specimen 600 are focused on the electro-optic probing sensor 610, thus forming an image of the specimen onto itself. The probing beam is then focused on the same optical axis as shown in FIG. 22.

Image interrogation by electro-optic probing utilizes terahertz induced birefringence of the probing sensor 610 which results in a change of its polarization. A polarizer 620 and an analyzer 630 are placed perpendicular to each other in the beam path. The analyzer 630 is placed between the probing sensor 610 and the CCD 700. Thus the CCD 700 sees the same polarization as the image. Phenomenologically, the probing beam can be thought of as a 'career' while the THz beam is the actual 'signal'.

For terahertz imaging, a state of the art is the terahertz time domain spectroscopy (THz-TDS), where a raster scanning is used for image formation. Obviously, for real-time imaging, a raster scanning method will be too slow to be effective. Therefore, a microscope based imaging technique with a CCD is desirable. In principle this is possible via the electro-optic probing method that is capable of capturing real-time terahertz images such as the one proposed herein.

Figure 23:
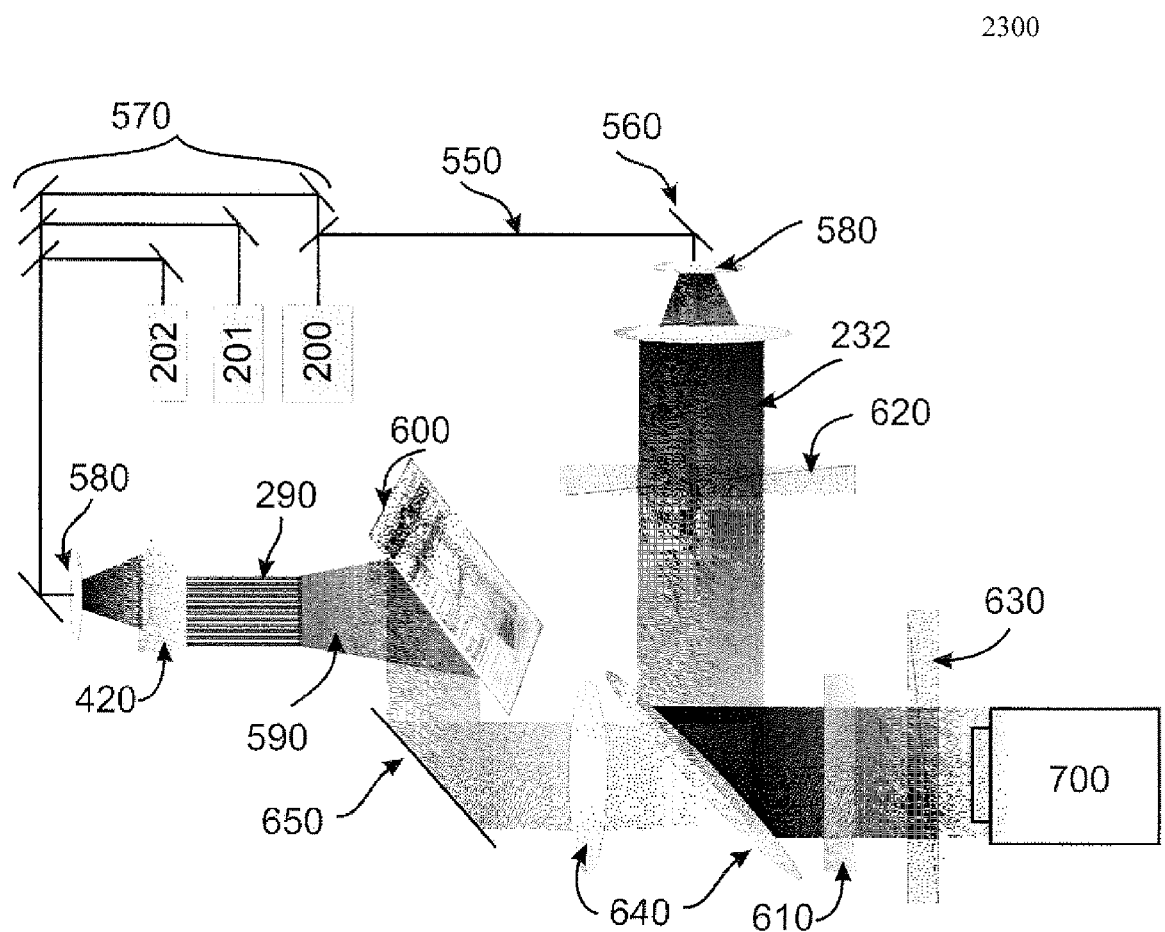
FIG. 23 shows an exemplary sensor chip with a demultiplexer in accordance with the invention.

For a real-time imaging system, the output power of the terahertz source is also important. Imaging can be done in both transmissive and reflective mode depending on the application and object characteristics. For example, a reflective method of imaging is more suitable for metallic objects while a transmissive method is more suitable for non-metallic objects. For this reason, the power output must be above the threshold of CCD excitation. The transmissive setup shown in FIG. 22 can be easily reconfigured for reflecting imaging and is shown in FIG. 23. It is almost identical to FIG. 22, except that the terahertz is reflected from the object to be identified. This is suitable for high reflectivity objects such as metallic one, or anything that will reflect rather than being transparent.

Additionally, for a microscope system, a continuous wave terahertz source, as opposed to a pulsed output system, is essential. Most of the terahertz sources available today utilize a pulsed laser input to create difference frequency mixing effect; consequently, the output is a pulsed terahertz radiation. The dendrimer electro-optic sensor developed during this project will allow to expanding the scope for a higher power CW terahertz technology.

Figure 24:
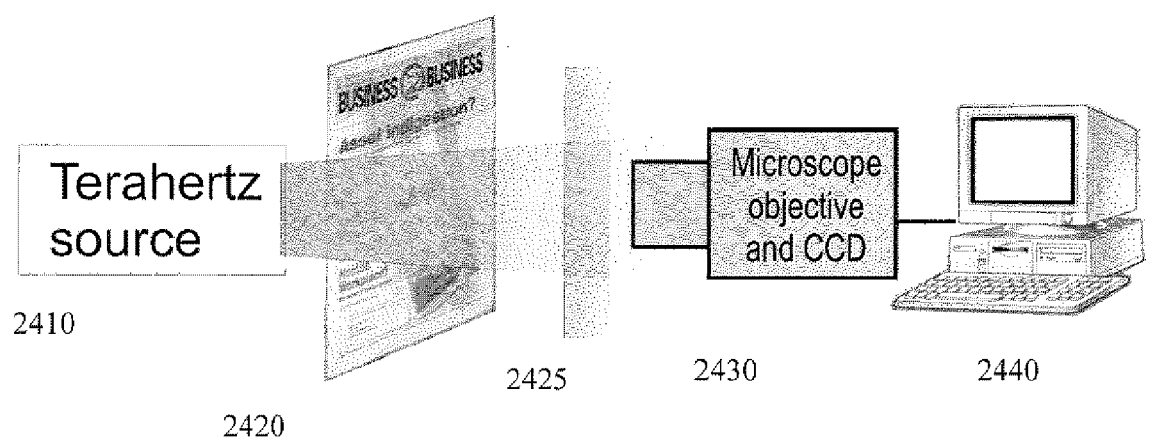
FIG. 24 shows an exemplary imaging system in accordance with the invention.

Referring now to FIG. 24, there is shown a system 2400 including a THz source 2410 for generating a THz beam that goes through a specimen 2420. An image is captured by microscope objective 2430 with the help of a probing sensor 2425. The image is recorded by CCD 2440 and then used to analyze the specimen 2420.

Other embodiments of the invention will be apparent to those skilled in the art from a consideration of this specification or practice of the invention disclosed herein; the scope and spirit of the invention being indicated by the following claims.

What is claimed is:

1. An electro-optic sensor, comprising:
a waveguide; and
the waveguide having a dendrimer core that has an enhanced electro-optic coefficient and magnetic susceptibility resulting from poling induced dipole orientation and the waveguide having at least one dendrimer cladding layer,
wherein a refractive index of the at least one dendrimer cladding layer is lower than a refractive index of the dendrimer core, and
wherein the sensor is configured to receive terahertz rays of a specimen for image interrogation.

2. The electro-optic sensor of claim 1, wherein the dendrimer core and the at least one dendrimer cladding layer contains an enhanced number of dipole moments generated from poling at a high electric field at an elevated temperature, and the dipoles are frozen-in to obtain a uniaxial polar material.

3. The electro-optic sensor of claim 1, wherein the waveguide is an array and is implemented as one of a Mach-Zehnder structure, an electro-absorption sensor or a modulating sensor.

4. The electro-optic sensor of claim 1, wherein the dendrimer core and the at least one dendrimer cladding layer is poled in-situ or ex-situ at a high electric field at an elevated temperature therein incorporating a uniaxial polar material.

5. The electro-optic sensor of claim 4, wherein the dendrimer core and the at least one dendrimer cladding layer is formed from Generation 0 to Generation 11 dendrimers.

6. The electro-optic sensor of claim 1, wherein the dendrimer core is modified via liquid phase doping.

7. The electro-optic sensor of claim 1, wherein the dendrimer core is deposited on a substrate of the waveguide along with at least one electro-optic device using lithographic processing to produce a nanophotonic integrated circuit, wherein the dendrimer core allows a monolithic fabrication route to integrate multiple functionalities on a chip.

8. The electro-optic sensor of claim 1, wherein the dendrimer core is modified and then is formed from a film that is cured at a temperature between 80° C. and 400° C. and further wherein the cured film has a glass transition temperature higher than 85° C. and suitable for continuous stable operation and extended life.

9. The electro-optic sensor of claim 1, wherein the dendrimer core and the at least one dendrimer cladding is doped with at least one dopant from a group of dopants comprised of the following non-linear organic chromophores: (2,6-Dimethyl-4H-pyran-4-ylidene)malononitrile; (S)-(−)-1-(4-Nitrophenyl)-2-pyrrolidinemethanol; [44Bis(2-hydroxyethyl)amino]phenyl]-1,1,2-ethylenetricarbonitrile; 1-Docosyl-4-(4-hydroxystyryl)pyridinium bromide; 2-(Dimethylamino)vinyl-1-nitronaphthalene; 2,3,5,6-Tetrafluoro-7,7,8,8-tetracyanoquinodimethane; 24[5-(Dibutylamino)-2-thienyl]methylene]-1H-indene-1,3(2H)-di one; 244-((4-(Bis(2-hydroxyethypamino]phenyl)(cyano)methylene]-2,5-cyclohexadien-1-ylidene]malononitrile; 2-[4-(Dimethylamino)styryl]pyridine; 2-[Ethyl[4-[2-(4-nitrophenyl)ethenyl]phenyl]amino]ethanol; 2-Amino-3-nitropyridine; 2-Amino-5-nitropyridine; 2-Aminofluorene; 2-Chloro-3,5-dinitropyridine; 2-Chloro-4-nitroaniline; 2-Methyl-4-nitroaniline; 2-Nitroaniline; 3-[(4-Nitrophenyl)azo]-9H-carbazole-9-ethanol; 3-Methyl-4-nitropyridine N-oxide; 3-Nitroaniline; 4-(Dibenzylamino)benzaldehyde-N,Ndiphenylhydrazone; 4-[4-(Dimethylamino)styryl]-1-docosylpyridinium bromide; 4-[4-(Dimethylamino)styryl]pyridine; 4-Dimethylamino-4¢-nitrostilbene; 4-Nitroaniline; 5-Nitroindole; 5-Nitrouracil; 7,7,8,8-Tetracyanoquinodimethane; 9-Ethyl-3-carbazolecarboxaldehyde-N-methyl-N-phenylhydrazone; Disperse Orange 25; Disperse Orange 3; Disperse Red 13; Disperse Red 13; Disperse Red 19; Disperse yellow 7; Ethyl 4-(dimethylamino)benzoate; Gentian Violet, ACS reagent; Gentian Violet; N-(2,4-Dinitrophenyl)-L-alanine methyl ester; N,N-Dimethyl-N¢-[(5-nitro-2-thienyl)methylene]-1,4-phenylenediamine; N-[3-Cyano-3[4-(dicyanomethyl)phenyl]-2-propenylidenel-N-ethyl-ethaniminium inner salt; Nile Blue A; N-Methyl-4-nitroaniline; trans-4-[4-(Dimethylamino)styryl1-1-methylpyridinium iodide; and trans-4-[4-(Dimethylamino)styryl1]-1-methylpyridinium p-toluenesulfonate.

10. The electro-optic sensor of claim 1, further comprising:
an antenna for receiving a radiated high frequency electric field, wherein the induced field is used to modulate an optical signal with the sensor; and
a detection circuit for source identification.

11. The electro-optic sensor of claim 10, wherein the sensor and antenna are each implemented as an array.

12. An imaging system for an object, comprising:
a terahertz emitter having a functionalized dendrimer for generating terahertz radiation at a high pump-terahertz conversion efficiency and high power, wherein the terahertz radiation is directed at the object;
a sensor having a functionalized dendrimer core that has an enhanced electrooptic coefficient and magnetic susceptibility resulting from poling induced dipole orientation, wherein a terahertz image generated of the object is imaged by the sensor, and
the sensor having a dendrimer cladding layer, wherein a refractive index of the dendrimer cladding layer is lower than that of the dendrimer core.

13. The imaging system of claim 12, wherein the image is interrogated by the sensor.

14. The imaging system of claim 13, wherein the image is visualized and recorded by an analysis system.

15. The imaging system of claim 12, wherein an array of waveguides provides wide area imaging.

16. The imaging system of claim 12, wherein the terahertz emitter and the sensor are pumped by an identical source.

17. The imaging system of claim 12, wherein the imaging is done in a transmissive mode, a reflective mode or both transmissive and reflective mode.

18. The imaging system of claim 12, wherein the emitter is one of a bulk dendrimer and a waveguide having the functionalized dendrimer as a core.

19. A nanophotonic integrated circuit sensor for detecting objects, comprising:
at least one modulator having a dendrimer core and a dendrimer cladding layer; and
at least one antenna feed, wherein the antenna feed provides collected electromagnetic radiation from the objects to the modulator, the collected electromagnetic radiation serving as the modulating excitation to the modulator,
wherein modulated signals are representative signatures for the objects.

20. The sensor of claim 19, wherein the at least one modulator is an array and the at least one antenna feed is an array, further comprising:
a demultiplexer having outputs corresponding to the array of modulators, the demultiplexer feeding a signal to each of the modulators, and
a multifiber array coupled to the modulators for outputting the modulated signals to an analysis system.

* * * * *